United States Patent [19]

Matthews et al.

[11] Patent Number: 5,826,946
[45] Date of Patent: Oct. 27, 1998

[54] VEHICLE SEAT SUPPORT PANEL

[75] Inventors: Bryon R. Matthews, Grand Blanc; Ed Dishner, Davison; Michael E. Rhoads, Shelby Township, all of Mich.

[73] Assignee: Lear Corp., Southfield, Mich.

[21] Appl. No.: 961,337

[22] Filed: Oct. 30, 1997

[51] Int. Cl.$^6$ .................................................. A47C 7/02
[52] U.S. Cl. .............................. 297/452.57; 297/216.13; 297/452.38; 297/474
[58] Field of Search ........................... 297/452.18, 452.2, 297/483, 452.38, 452.55, 452.57, 452.58, 452.59, 216.1, 216.13, DIG. 3, 474, 468; 280/728.1, 730.1, 730.2

[56] References Cited

U.S. PATENT DOCUMENTS

| | | |
|---|---|---|
| 4,186,966 | 2/1980 | Harder, Jr. . |
| 4,265,483 | 5/1981 | Raftery et al. . |
| 4,275,925 | 6/1981 | Harder, Jr. . |
| 4,390,210 | 6/1983 | Wisniewski et al. . |
| 4,544,205 | 10/1985 | Molnar . |
| 4,580,837 | 4/1986 | Bayley . |
| 4,637,650 | 1/1987 | Inoue . |
| 4,786,103 | 11/1988 | Selbert . |
| 4,792,189 | 12/1988 | Shovar . |
| 5,067,772 | 11/1991 | Koa . |
| 5,067,773 | 11/1991 | Koa . |
| 5,251,963 | 10/1993 | Inayoshi et al. . |
| 5,288,133 | 2/1994 | Mizushima et al. . |
| 5,326,155 | 7/1994 | Wild . |
| 5,441,332 | 8/1995 | Verellen . |
| 5,503,428 | 4/1996 | Awotwi et al. . |
| 5,522,645 | 6/1996 | Dahlbacka . |
| 5,651,582 | 7/1997 | Nakano . |

*Primary Examiner*—Milton Nelson, Jr.
*Attorney, Agent, or Firm*—MacMillan, Sobanski & Todd, LLC

[57] ABSTRACT

A vehicle seat assembly having a seat bottom and a seat back. The seat back includes a rigid frame supporting a resilient foam cushion encased by a trim cover material. The seat back has a cutaway section defining a void space in the foam cushion and two apertures in the trim cover material. A rigid support panel is secured to a corner of the seat back frame. The panel is seated in the cutaway section of the seat back frame to fill the void space in the foam cushion between the trim cover material and the seat back frame. The support panel has first and second openings for providing rigid passageways through the two apertures in the trim cover material. The first opening extends along a first axis for supporting a seat belt tower to the seat back frame. The second opening extends along a second axis traverse to the first axis for supporting a side impact air bag on the seat back frame. The support panel occupies a portion of the seat back's contour and provides a rigid surface and aperture for receiving and supporting the two components on the seat back frame.

13 Claims, 5 Drawing Sheets

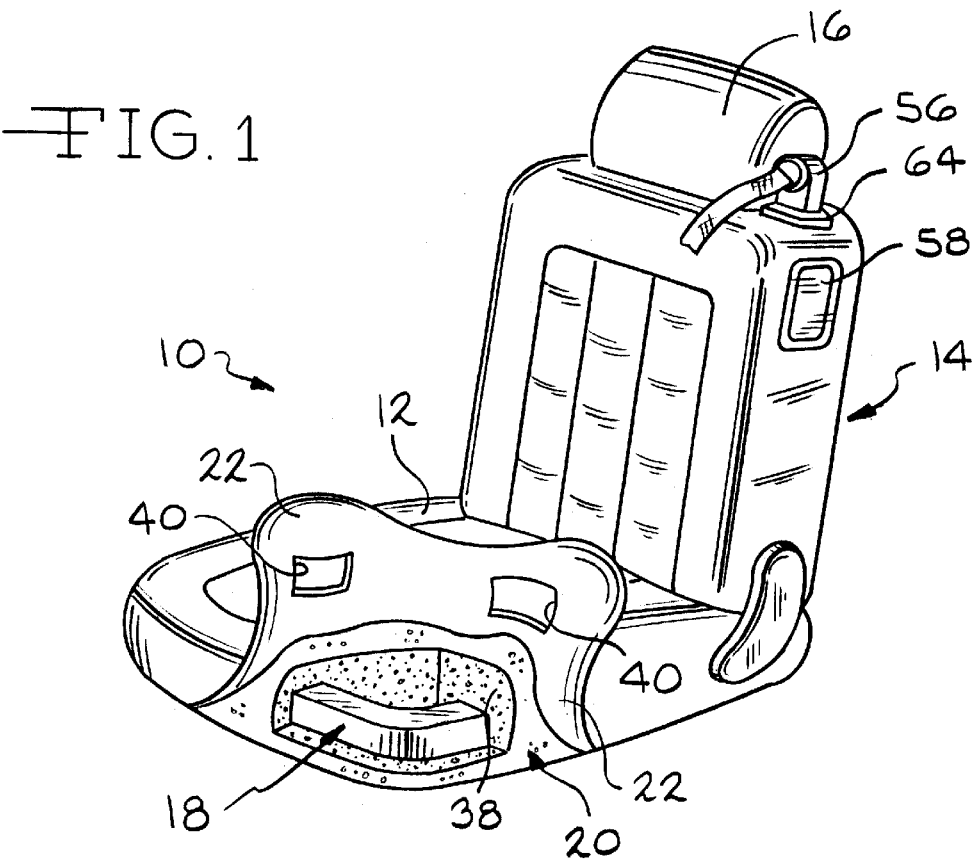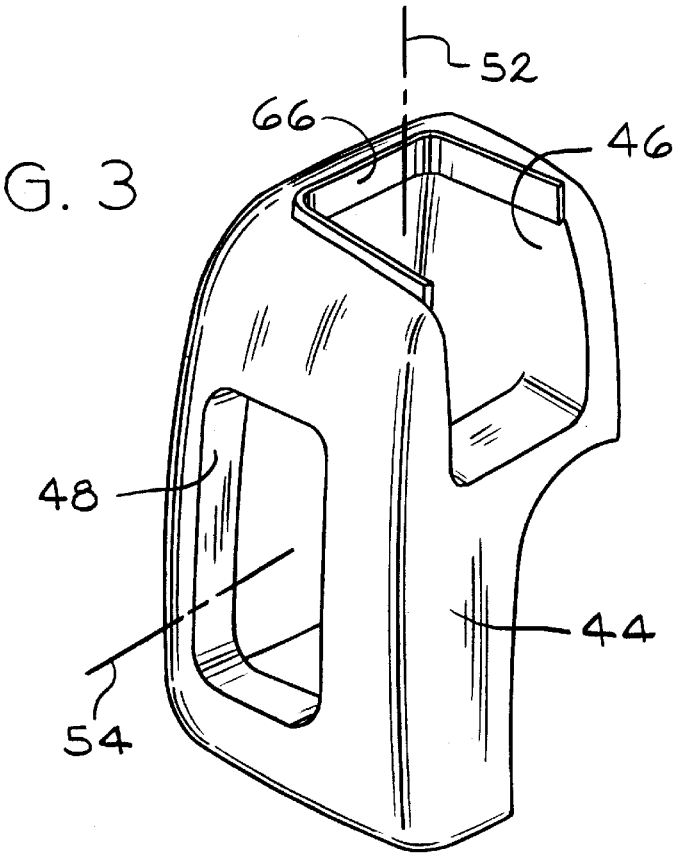

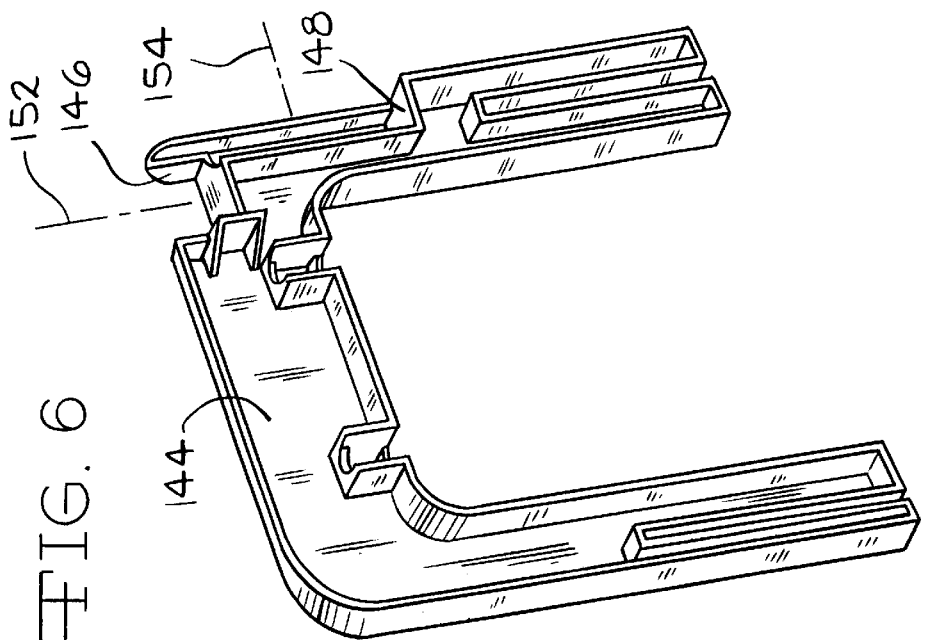
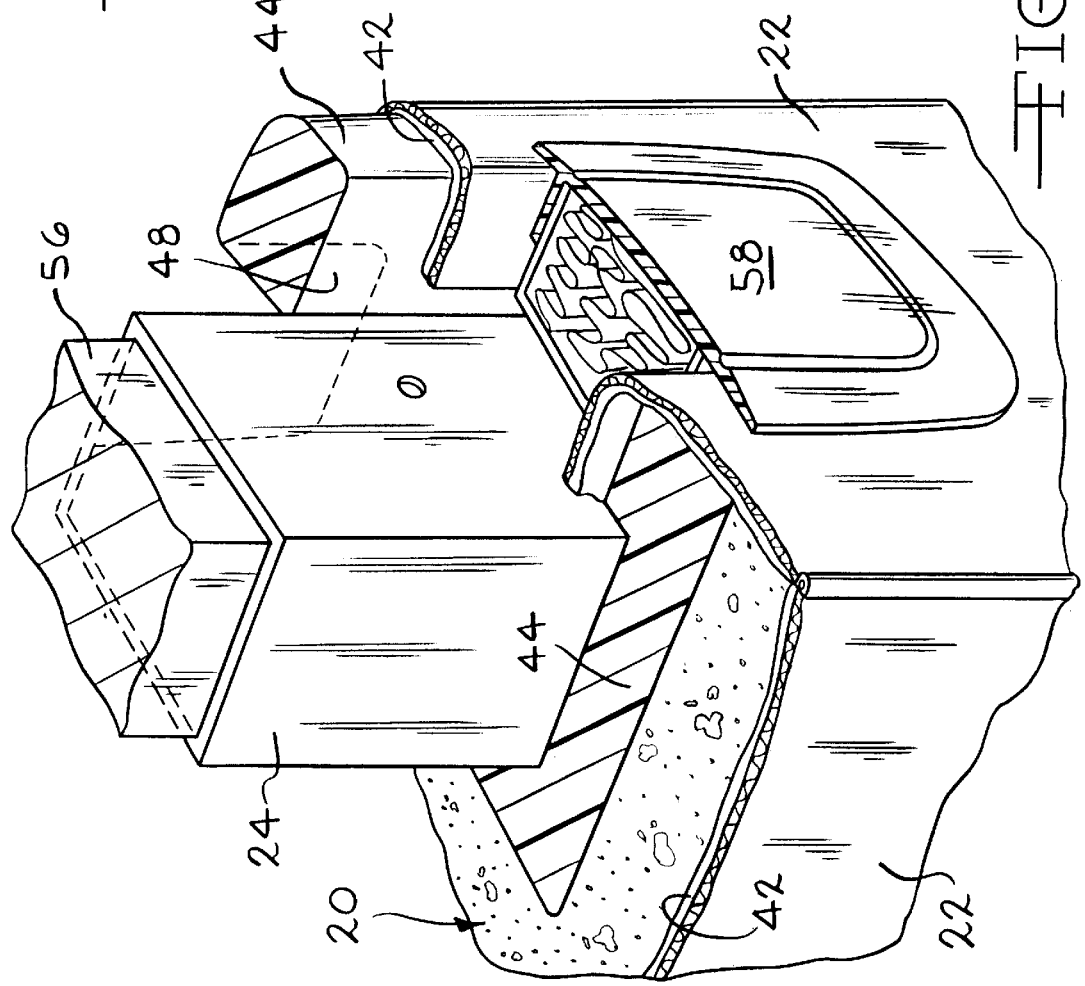

VEHICLE SEAT SUPPORT PANEL

TECHNICAL FIELD

The subject invention relates to vehicle seat assemblies having at least two components mounted to a seat frame. More specifically, the subject invention relates to a support panel that occupies a portion of the seat's contour and provides a rigid surface and opening for receiving and supporting the components on the seat frame.

BACKGROUND OF THE INVENTION

Vehicle seat assemblies typically include a substantially horizontal seat bottom and a substantially upright seat back pivotally attached to the seat bottom. Each of the seat bottom and seat back have a seat frame supporting a resilient foam cushion encased by a trim cover material. The foam cushion has an external front surface and side surfaces and an internal contour which is complementary in shape to the seat frame. Once installed around the seat frame the foam cushion entirely covers the seat frame. Typically, the trim cover material encapsulates the front and side surfaces and wraps around to a rear surface of the foam cushion and is secured to the rear of the seat frame by a number of retaining strips. There may be holes in the seat back, foam cushion and trim cover to allow for mounting of a headrest to the top of the seat back frame.

The automotive industry has traditionally mounted the seat belt assemblies to the vehicle floor pan. However, there is an increasing trend to incorporate the seat belt shoulder harnesses directly onto the seat frame assembly. Specifically, these shoulder harnesses are mounted to a telescoping tower which moves within the outboard side of the seat back frame. Some advantages of this design are ease of manufacture, safety, adjustability, and added seating comfort when using the seat belts. One disadvantage is that this design creates a large cavity in the foam cushion and trim cover which can be difficult to aesthetically cover. In other words, it can be difficult to retain the trim cover within the cavity while maintaining the correct aesthetic contour of the seat back. In addition, as the tower moves upwardly and downwardly the trim cover must not interfere with this movement nor can there be a substantial gap between the trim cover and tower which could create a safety hazard.

Another trend in the automotive industry is to provide vehicle seat occupants protection during a side impact collision by the use of side impact air bag assemblies. These side impact air bags are mounted to the side of the seat frame and extend through a bolster section of the seat bottom or seat back. Hence, another large cavity is formed in the foam cushion and trim cover which again can be difficult to aesthetically cover.

Side impact air bags are also mounted to the outboard side of the seat back and are typically mounted near the top corner of the seat back. Hence, the side impact air bag is mounted in close proximity to the telescoping tower. This configuration can make it very difficult to retain the trim cover within the two cavities while maintaining the correct aesthetic contour of the seat back. Also, manufacturing a foam cushion with two opposing openings can be very difficult and time consuming.

SUMMARY OF THE INVENTION AND ADVANTAGES

A vehicle seat assembly comprising a generally horizontal seat bottom defining an occupant sitting area and a generally upright seat back defining an occupant back support. Each of the seat bottom and the seat back include a rigid frame supporting a resilient foam cushion encased by a trim cover material. At least one of the seat bottom and the seat back has a cutaway section defining a void space in the foam cushion and a plurality of apertures in the trim cover material. A rigid support panel is secured to one of the frames. The panel is seated in the cutaway section to fill the void space in the foam cushion between the trim cover material and the frame. The support panel has first and second openings for providing rigid passageways through the apertures in the trim cover material and the openings in the support panel to provide access to the frame.

Specifically, the foam cushion is secured to a first portion of the frame and the support panel is secured to a second portion of the frame to provide access through the trim cover material and the support panel to the second portion of the frame. The first opening extends along a first axis and the second opening extends along a second axis traverse to the first axis.

Accordingly, the subject invention utilizes a one piece support panel mounted to the seat back frame which can support and retain a tower along the first axis, vertically, and a side impact air bag along the second axis, horizontally. The support panel occupies the space once filled by the foam cushion which ensures an aesthetically pleasing contour to the seat back.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a vehicle seat assembly incorporating the subject invention;

FIG. 3 is a perspective view of the subject invention;

FIG. 4 is a cross-sectional view of the seat back assembly according to FIG. 2;

FIG. 6 is a perspective view of the alternative embodiment of the subject invention.

DETAILED DESCRIPTION OF THE PREFERRED EMBODIMENT

Referring to the Figures, wherein like numerals indicate like or corresponding parts throughout the several views a vehicle seat assembly is generally shown at 10 in FIG. 1. The seat assembly comprises a substantially horizontal seat bottom 12 defining an occupant sitting area and a substantially upright seat back, generally shown at 14, defining an occupant back support. A headrest 16 is slideably mounted to a top of the seat back 14.

Figure 2:
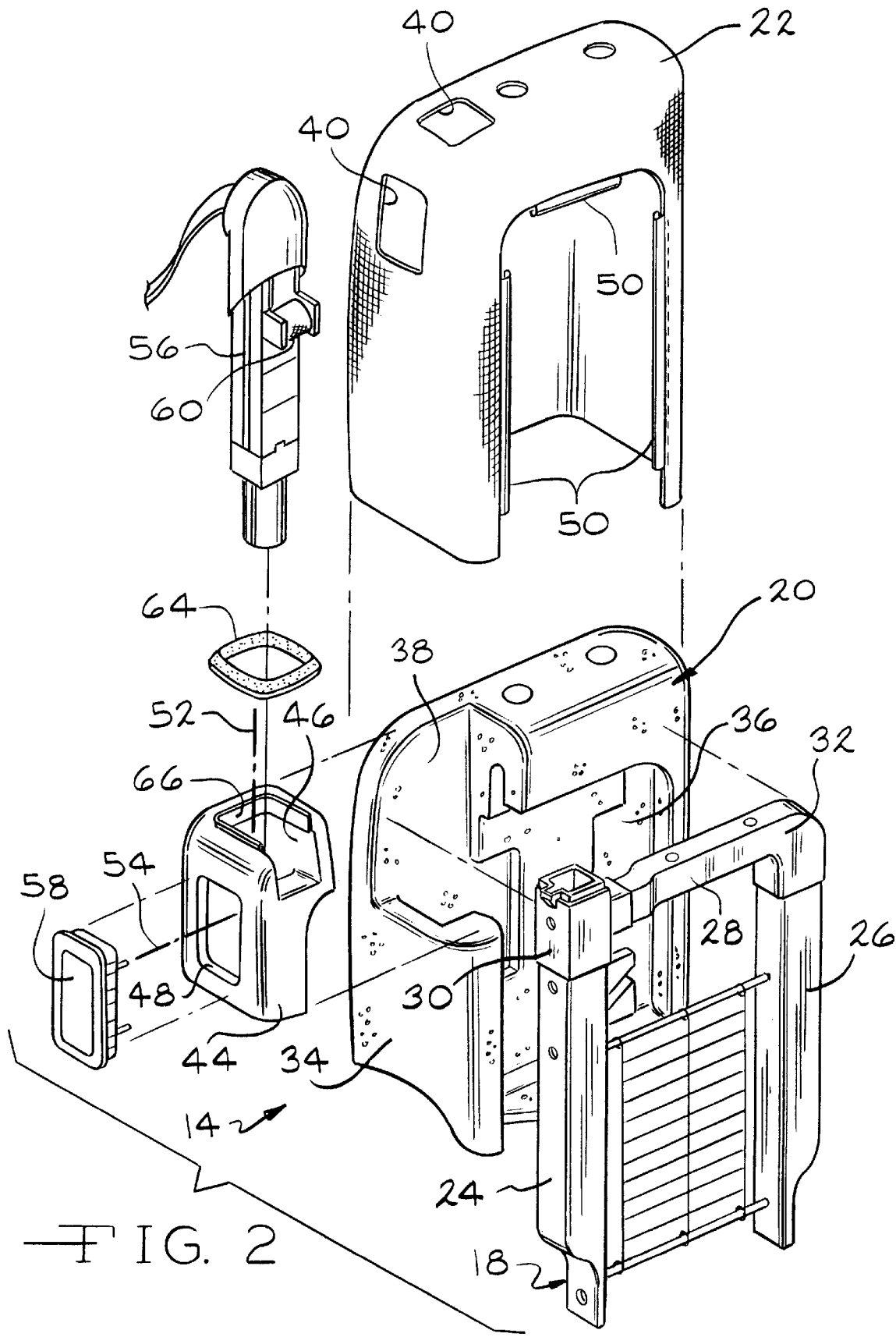
FIG. 2 is an exploded perspective view of the vehicle seat back assembly.

Referring also to FIGS. 2 and 4, both the seat bottom 12 and the seat back 14 include a rigid frame, generally shown at 18, supporting a resilient foam cushion, generally shown at 20, encased by a trim cover material 22. For illustrative purposes, only a seat back frame 18 with a corresponding foam cushion 20 and trim cover material 22 is described and shown in greater detail. As appreciated by those skilled in the art, the seat bottom 12 may also have all of the features of the seat back 14 described herein.

The seat back frame 18 includes a first side 24, a second side 26 and a cross beam 28 interconnecting the sides 24, 26. The first side 24 and the cross beam 28 form a first corner 30 and the second side 26 and the cross beam 28 form a second corner 32. The foam cushion 20 has an external front surface (not shown), side surfaces 34 and an internal contour 36 which is complementary in configuration with the seat back frame 18. The external front surface can be contoured to any desirable design as is well known in the art. The seat back 14 has a cutaway section defining a void space 38 in the foam cushion 20 and a plurality of apertures 40 in the trim cover material 22. In the preferred embodiment, the void space 38 occupies a portion of the side surface 34 of the foam cushion 20. As discussed above, the seat bottom 12 may also have a cutaway section in the corresponding foam cushion and apertures in the corresponding trim cover material. The foam cushion 20 may be manufactured of any suitable material by any suitable method as is well known in the art. In addition, the trim cover material 22 may be cloth, leather, vinyl or any other suitable material as is well known in the art. As shown in FIG. 4, a thin layer of padding 42 is secured to the interior of the trim cover material 22.

A rigid support panel 44 is secured to one of the frames 18. Specifically, the panel 44 is seated in the cutaway section of the seat back frame 18 to fill the void space 38 in the foam cushion 20 between the trim cover material 22 and the seat back frame 18. More specifically, when the seat back 14 is assembled, the support panel 44 mounts to the seat back frame 18 and abuts the foam cushion 20. The trim cover material 22 then encapsulates all of these parts. Hence, the support panel 44 occupies a portion of the seat back's contour. More specifically, the support panel 44 occupies a portion of the foam cushion's contour.

Referring also to FIG. 3, the support panel 44 has first 46 and second 48 openings for providing rigid passageways through the apertures 40 in the trim cover material 22 and the openings 46, 48 in the support panel 44 to provide access to the frame 18. In other words, the trim cover material 22 has two apertures 40 which align with the two openings 46, 48 in the support panel 44 to provide access to the seat back frame 18. A number of retaining strips 50 are secured to the trim cover material 22 for securing the trim cover material 22 to the seat back frame 18. Specifically, the trim cover material 22 encapsulates the front and side 34 surfaces and wraps around to the internal contour 36 of the foam cushion 20 and is secured to the rear of the seat back frame 18.

The first opening 46 extends along a first axis 52 and the second opening 48 extends along a second axis 54 traverse to the first axis 52. In the preferred embodiment, the second axis 54 is substantially perpendicular to the first axis 52. The opposing axes 52, 54 of the first 46 and second 48 openings could extend along any direction so long as they remain traverse to each other. One advantage of the subject invention is now clearly defined. Specifically, the area of the foam cushion 20 that would have these two opposing cavities is replaced by the support panel 44.

As best shown in FIG. 2, the foam cushion 20 is secured to a first portion of the frame 18 and the support panel 44 secured to a second portion of the frame 18 to provide access through the trim cover material 22 and the support panel 44 to the second portion of the frame 18. Specifically, in the preferred embodiment, the support panel 44 is mounted to the first corner 30 and extends along the first side 24 of the seat back frame 18. Hence, the first portion of the seat back frame 18 includes the cross beam 28, second corner 32, second side 26, and a portion of the first side 24. The second portion of the seat back frame 18 includes the first corner 30 and the portion of the first side 24 that is covered by the support panel 44. The support panel 44 is secured to the seat back frame 18 by snap fasteners, screws, or the like which are well known in the art.

The first opening 46 supports a first component 56 on the frame 18 and the second opening 48 supports a second component 58 on the frame 18. Specifically, the first component 56 is mounted to the first corner 30 and the first side 24 of the frame 18 and passes upwardly through the first opening 46 in the support panel 44 along the first axis 52. More specifically, the first component 56 extends into the first side 24 of the seat back frame 18. The second component 58 is mounted to the first side 24 of the frame 18 and passes through the second opening 48 in the support panel 44 along the second axis 54. Hence, the support panel 44 provides a rigid surface and opening for receiving and supporting the components 56, 58 on the seat back frame 18.

In the embodiment shown, the first component 56 is a seat belt tower slideably mounted to the seat back frame 18 and the second component 58 is a side impact air bag assembly mounted to the first side 24 of the seat back frame 18. Specifically, the tower 56 moves vertically and extends substantially parallel to the first side 24 along the first axis 52 and the air bag assembly 58 extends substantially horizontal along the second axis 54 perpendicular to the first side 24. Accordingly, one aperture 40 in the trim cover material 22 is in the top of the trim 22 and the other aperture 40 in the trim cover material 22 is in the side of the trim 22. A seat belt retractor 60 is mounted to the tower 56 within the first opening 46 in the support panel 44. Specifically, a groove 62 is cut into the first opening 46 to provide clearance for the seat belt retractor 60. Seat belt towers and side impact air bag assemblies are well known in the art and may be of any suitable design without deviating from the scope of the subject invention. In addition, other components could be utilized in the subject invention without deviating from the inventive scope outlined in the appending claims.

A ring 64 is mounted to the support panel 44 around the first opening 46 and surrounding the first component 56, i.e., the tower. A ridge 66 extends upwardly from the first opening 46 in the support panel 44 for locking engagement with the ring 64 to retain the ring 64 against the trim cover material 22. As shown in FIG. 1, the ring 64 mounts to the outside of the trim cover material 22 and secures the trim cover material 22 to the support panel 44. Hence, the trim cover material 22 does not interfere with the movement of the telescoping tower 56 nor is there a substantial gap between the trim cover material 22 and the tower 56.

Figure 5:
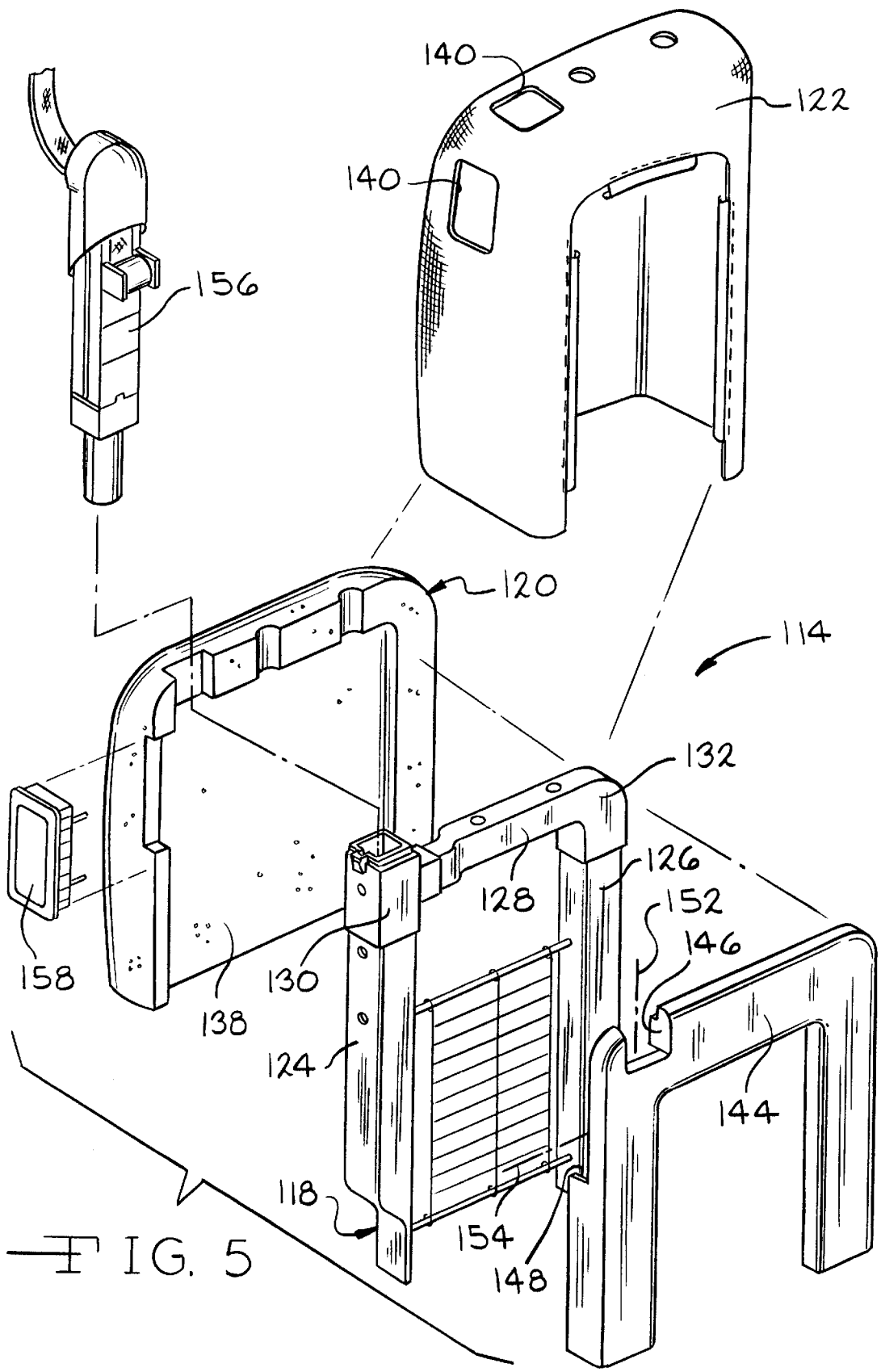
FIG. 5 is an exploded perspective view of the vehicle seat back assembly incorporating an alternative embodiment of the subject invention.
Figure 7:
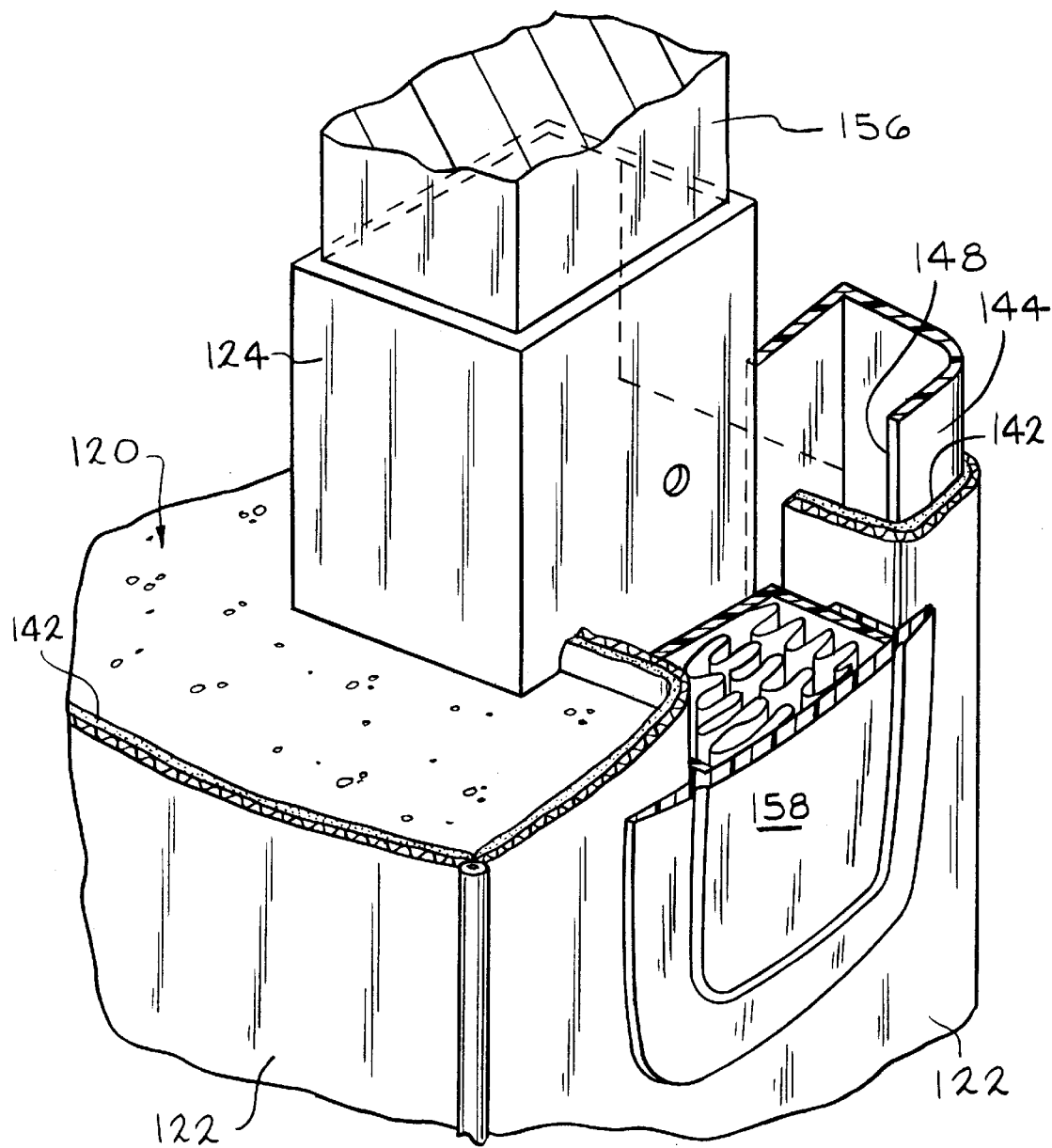
FIG. 7 is a cross-sectional view of the seat back assembly according to FIG. 5.

An alternative embodiment of the subject invention is shown in FIGS. 5, 6, and 7, wherein like numerals increased by one hundred indicate like or corresponding parts. The rigid support panel 144 of this embodiment is mounted along a majority of the first 124 and second 126 sides, the first 130 and second 132 corners and the cross beam 128 of the seat back frame 118. The void space 138 in the resilient foam cushion 120 of this embodiment is substantially the entire rear section of the foam cushion 120. In other words, the foam cushion 120 is cut in half and only covers the front half of the seat back frame 118 which constitutes the first portion of the seat back frame 118. The support panel 144 covers the rear half of the seat back frame 118 which constitutes the second portion of the seat back frame 118.

The support panel 144 fills the void space 138 in the foam cushion 120 between the trim cover material 122 and the seat back frame 118. Specifically, the first portion of the seat back frame 118 includes the front surface of the cross beam 128, first 130 and second 132 corners, and first 124 and second 126 sides. The second portion of the seat back frame 118 includes the back surface of the cross beam 128, first 130 and second 132 corners, and first 124 and second 126 sides. The support panel 144 is secured to the seat back frame 118 by similar snap fasteners, screws, or the like which are well known in the art.

The support panel 144 of the alternative embodiment also has opposing first 146 and second 148 openings along first 152 and second 154 axes, respectively. There are apertures 140 within the trim cover material 122 corresponding to the openings 152, 154 in the support panel 144. Referring to FIG. 7, the thin padding 142 is affixed along the interior surface of the trim cover material 122. As in the primary embodiment, a first component 156 is supported within the first opening 146 along the first axis 152 of the support panel 144. Similarly a second component 158 is supported within the second opening 148 along the second axis 154 of the support panel 144. The remaining aspects of this embodiment are substantially the same as in the primary embodiment.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A vehicle seat assembly comprising:
   a substantially horizontal seat bottom defining an occupant sitting area;
   a substantially upright seat back defining an occupant back support;
   each of said seat bottom and said seat back including a rigid frame supporting a resilient foam cushion encased by a trim cover material;
   at least one of said seat bottom and said seat back having a cutaway section defining a void space in said foam cushion and a plurality of apertures in said trim cover material;
   a rigid support panel secured to one of said frames, said panel seated in said cutaway section of said frame to fill said void space in said foam cushion between said trim cover material and said frame; and
   said support panel having first and second openings for providing rigid passageways through said apertures in said trim cover material and said openings in said support panel to provide access to said frame.

2. An assembly as set forth in claim 1 wherein said foam cushion is secured to a first portion of said frame and said support panel secured to a second portion of said frame to provide access through said trim cover material and said support panel to said second portion of said frame.

3. An assembly as set forth in claim 2 wherein said first opening extends along a first axis and said second opening extends along a second axis traverse to said first axis.

4. An assembly as set forth in claim 3 wherein said first opening supports a first component on said frame and said second opening supports a second component on said frame.

5. An assembly as set forth in claim 4 wherein each of said seat bottom and said seat back frames include a first side, a second side and a cross beam interconnecting said sides, said first side and said cross beam forming a first corner and said second side and said cross beam forming a second corner.

6. An assembly as set forth in claim 5 wherein said first component is mounted to said first corner and said first side of said frame and passes upwardly through said first opening in said support panel along said first axis.

7. An assembly as set forth in claim 6 wherein said second component is mounted to said first side of said frame and passes through said second opening in said support panel along said second axis.

8. An assembly as set forth in claim 7 wherein said support panel is mounted along a majority of said first and second sides, said first and second corners and said cross beam.

9. An assembly as set forth in claim 7 wherein said first component is a seat belt tower slideably mounted to said frame and said second component is an air bag assembly mounted to said first side of said frame.

10. An assembly as set forth in claim 9 including a seat belt retractor mounted to said tower within said first opening in said support panel.

11. An assembly as set forth in claim 7 wherein said support panel is mounted to said first corner and extends along a portion of said first side of said frame.

12. An assembly as set forth in claim 11 including a ring mounted to said support panel around said first opening and surrounding said first component.

13. An assembly as set forth in claim 12 including a ridge extending upwardly from said first opening in said support panel for locking engagement with said ring to retain said ring against said trim cover material.

* * * * *